July 31, 1923.

A. C. STAHL 1,463,447

REDUCTION GEAR MECHANISM

Filed Dec. 14, 1918

Inventor
AMBROSE C. STAHL

Witness
Karl F. Butler

By Bartlett Bartlett
Attorneys

Patented July 31, 1923.

1,463,447

UNITED STATES PATENT OFFICE.

AMBROSE C. STAHL, OF DETROIT, MICHIGAN.

REDUCTION-GEAR MECHANISM.

Application filed December 14, 1918. Serial No. 266,684.

*To all whom it may concern:*

Be it known that I, AMBROSE C. STAHL, a citizen of the United States of America, residing at Detroit, in the county of Wayne and State of Michigan, have invented certain new and useful Improvements in Reduction-Gear Mechanism, of which the following is a specification, reference being had therein to the accompanying drawings.

The primary object of my invention is to provide a reduction gear mechanism that may be advantageously used in the starting and lighting equipment of an automobile, particularly where a motor generator is coupled, directly or indirectly, to an engine shaft, so that the motor may be used for starting the engine or the started engine used as a source of power for generating electricity for a lighting system. Such is an example of the use of my reduction gear mechanism, which has been constructed to reduce speed when operated in one direction and to establish a direct connection when operated in the opposite direction, therefore, the mechanism besides being a gear reduction constitutes a two-speed transmission and may be used in various equipments.

A further object of my invention is to provide a reduction gear mechanism which is automatic in its change of operation, thereby obviating the necessity of using levers, brake bands and such devices heretofore employed for effecting a change in speed between the drive and driven shafts. The device by which this is accomplished is exceedingly compact, simple in construction, inexpensive to manufacture, and as a whole is particularly applicable to any vehicular equipment.

My invention will be hereinafter described and then claimed, and reference will now be had to the drawing, wherein Figure 1 is a longitudinal sectional view of the reduction mechanism;

Figure 1:
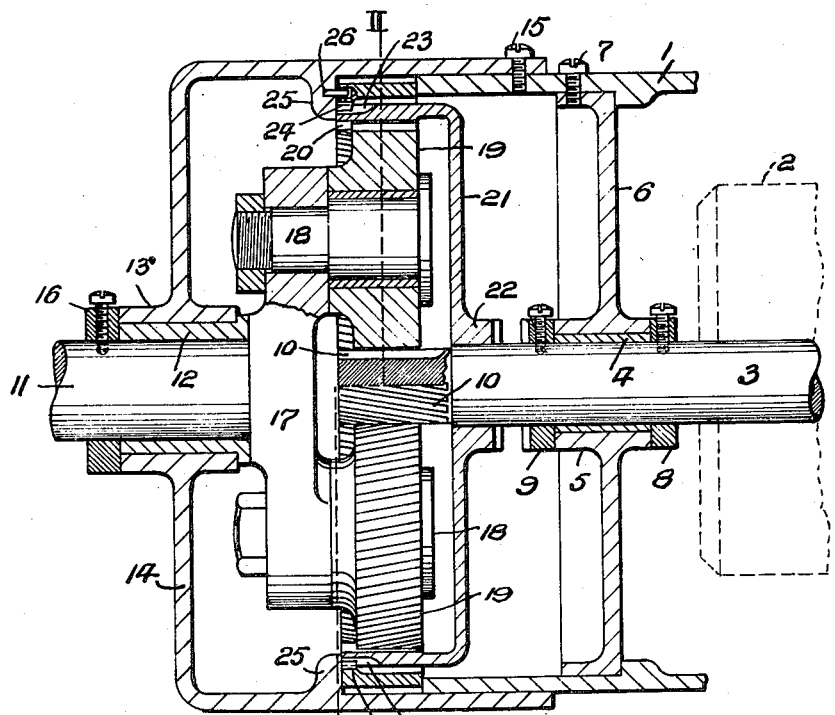
Figure 2:
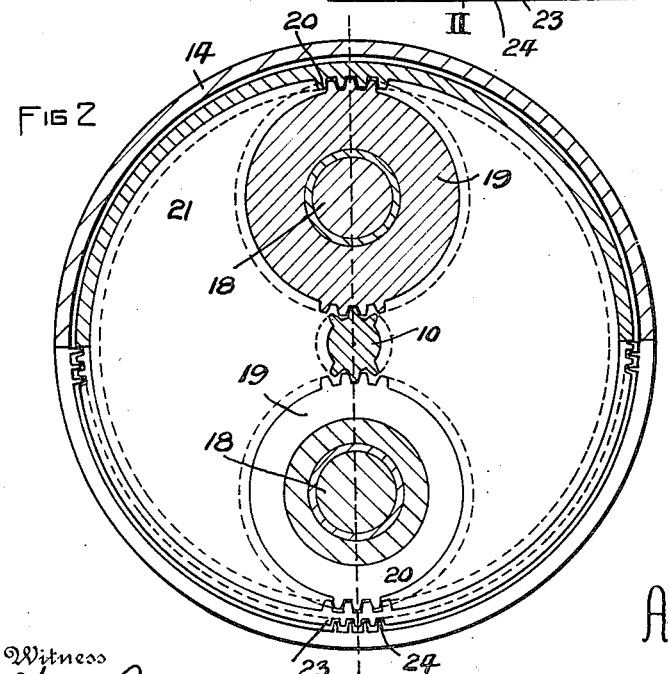
Fig. 2 is a cross sectional view taken on the line II—II of Fig. 1.

In the drawing, 1 denotes, by the way of an example, a cylindrical casing or support in proximity to a motor generator unit 2, which includes a drive shaft 3 extending into the casing 1 and journaled in a bushing 4 of a bearing 5 carried by a head 6 set in the casing 1 and fixed therein, for instance, by such securing means as indicated at 7. The driving shaft 3 is held against longitudinal movement relative to the bearing 5 by collars 8 and 9 mounted on the shaft 3, at the ends of the bearing 5, the collar 9 serving as a clutch member and as such will be hereinafter referred to.

The outer end of the drive shaft 3 is provided with a spiral gear 10 having a small spiral angle not to exceed thirty degrees with the axis of the gear shaft and to reduce the cost of manufacture, the spiral teeth may be cut in the periphery of said shaft. This shaft alines with a driven shaft 11 journaled in a bushing 12 mounted in a bearing 13 forming part of a cylindrical housing 14, said housing being fitted on the end of the casing 1 and held thereon by screws 17ª or other fastening means which will permit of the housing being removed in order that easy access may be had to the interior of the housing and the casing for assembling and lubricating elements therein. Longitudinal movement of the driven shaft 11 is prevented by a collar 16 mounted on said shaft at the outer end of the bearing 13 and by a spider or cross member 17 on the other end of the driven shaft. The spider or cross member 17 has its ends provided with stub shafts 18 for rotatable spiral gear wheels 19 which mesh with the spiral gear 10 of the drive shaft 3.

Figure 3:
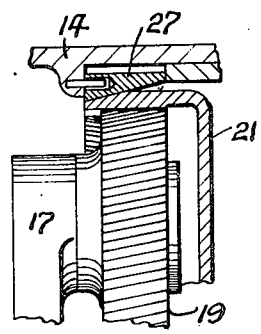
Fig. 3 is a detail sectional view of a modified form of clutch that may form part of the mechanism.

Adapted to mesh with the spiral gear wheels 19, which together with the spiral gear 10 are somewhat of the planetary type, are the spiral teeth 20 of a large thrust gear wheel 21, said thrust gear wheel having a clutch hub portion 22 slidable on the drive shaft 3, so that the said thrust gear may shift thereon and either establish a driving relation with the gear wheels 19 or become fixed relative to the clutch member 9. The spiral teeth 20 are on the inner wall of the large thrust gear 21 and the periphery of said thrust gear is provided with circumferentially disposed teeth 23 adapted to mesh with an internal rack 24 mounted in the housing 14 against an annular interior flange 25 carried thereby, said flange being provided with a pin 26 or other suitable means for holding the rack against rotation therein. The internal rack 24 serves functionally as an outer clutch member and the periphery of the thrust member 21 serves as an inner clutch member, and it is in this connection that the periphery of the thrust gear 21 and the internal rack may be constructed as shown in Fig. 3. In this view the periphery of the thrust gear 21 is shown as being beveled or conical to frictionally engage the beveled seat of a ring 27 set in the housing 14. It is therefore apparent that the clutch between the housing 14 and the thrust gear 21 may be of the toothed, conical or frictional type, and as such serves in this particular instance as means for holding the clutch gear 21 stationary relative to the housing 14 under certain operative conditions.

The clutch serves as a brake and considering the operation of the mechanism, with the thrust gear 21 held by the brake or interlocked with the internal rack, and assuming that the drive shaft 3 is to start the driven shaft 11, then the spiral gear 10 imparts movement to the spiral gear wheels 19 which roll on the teeth 20 of the thrust gear 21, by reason of the thrust gear being held by the internal rack 24 relative to the housing 14. The direction of rotation of the spiral gear wheels produces an end thrust of the large gear 21 towards the internal rack, consequently the thrust gear 21 is held stationary causing the spider 17 to revolve in the same direction as the drive shaft 3 and thus impart a similar direction of rotation to the driven shaft 11, but at a reduced speed, for instance a reduction of ten to one as indicated in the drawing.

When the driven shaft 11 serves as a gasoline engine shaft and is started by the drive shaft 3 serving as a motor generator shaft and gains its normal speed, then the speed of the driven shaft 11 will be greater than the drive shaft 3. However, changing the spiral gear wheels 19 from driven to drive elements changes the direction of thrust on the same, without any change in the direction of the shaft 11. Therefore, the thrust on the gear 21 from the spiral gear wheels 19 becomes changed to opposite direction, from that previously described, causing the large thrust gear 21 to shift inwardly and out of engagement with the internal rack 24 and into engagement with the clutch member of collar 9 thus locking gears 21 and 10. As soon as this is accomplished there is no gear reduction, and the shaft 3 is driven at the same speed as the engine shaft 11. It will be noted however, that when gear 21 slides out of engagement with the internal rack 24 there is a neutral position before engagement with the clutch collar 9. While in this position, the gear 21 is free to revolve in either direction and floats on the shaft 3 without restraint. However, due to force required to overcome inertia of the gear 21 against rotation sufficient end thrust will be developed to slide gear axially into engagement with the clutch. It is now apparent that the inherent tendency of meshing spiral gears to produce an end thrust is utilized to effect a braking action just as though the periphery of the thrust gear 21 were engaged by a manually actuated brake band. Also when the shaft 11 is the driving element the thrust of the spiral gears is utilized to effect a clutching action between thrust gear 21 and gear 10, tending to lock said gears. My braking action is automatic, and consequently I am able to compactly assemble all the mechanism necessary in the enclosed housing 14.

It is thought that the operation and utility of the reduction gear mechanism will be apparent without further description, and while in the drawing there is illustrated the preferred embodiments of my invention, it is to be understood that the structural elements are susceptible to such variations and modifications as fall within the scope of the appended claim.

What I claim is:—

In a reduction gear mechanism, a housing, a drive shaft extending in said housing, a driven shaft extending in said housing, a stationary internal rack in said housing, spiral gears supported from said driven shaft and bodily movable thereby about the axis of said driven shaft and meshing with a gear portion of said drive shaft, and means including a thrust gear shiftable on said drive shaft adapted to be operatively interposed between said spiral gears and said stationary internal rack to be held stationary relative to said drive shaft by said internal rack to effect a change in speed between said drive and driven shafts.

In testimony whereof I affix my signature in the presence of two witnesses.

AMBROSE C. STAHL.

Witnesses:—
 ANNA M. DORR,
 KARL H. BUTLER.